Nov. 20, 1923.

G. W. MOORE 1,475,022

MOTOR DRIVEN MANICURING DEVICE

Filed Jan. 27, 1923

2 Sheets-Sheet 1

Nov. 20, 1923.                                            1,475,022
                    G. W. MOORE
            MOTOR DRIVEN MANICURING DEVICE
                 Filed Jan. 27, 1923         2 Sheets-Sheet 2

Witnesses:

Inventor:
George W. Moore
By Joshua R H Cooke
His Attorney

Patented Nov. 20, 1923.

1,475,022

UNITED STATES PATENT OFFICE.

GEORGE W. MOORE, OF CHICAGO, ILLINOIS.

MOTOR-DRIVEN MANICURING DEVICE.

Application filed January 27, 1923. Serial No. 615,221.

*To all whom it may concern:*

Be it known that I, GEORGE W. MOORE, a citizen of the United States, and a resident of the city of Chicago, county of Cook, and State of Illinois, have invented certain new and useful Improvements in Motor-Driven Manicuring Devices, of which the following is a specification.

This invention relates to motor driven manicuring devices and has for its object the provision of a device of this character which is adapted to be detachably connected to and driven by a suitable motor, together with means for detachably mounting manicuring tools of various kinds in said device.

Other objects will appear hereinafter.

The invention consists in the combinations and arrangements of parts hereinafter described and claimed.

Figure 1:
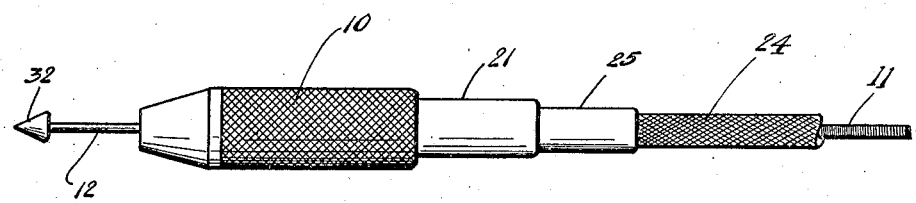
Figure 2:
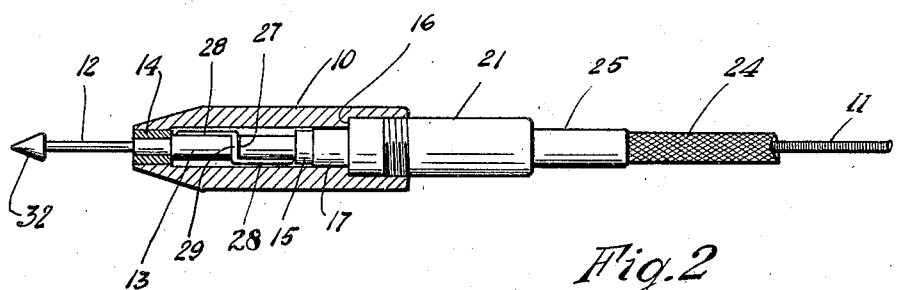
Figure 3:
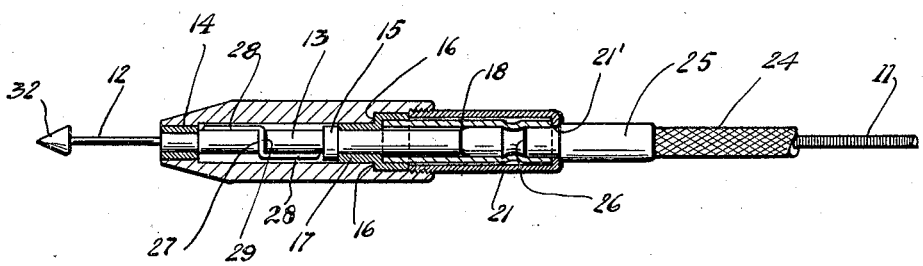
Figure 4:
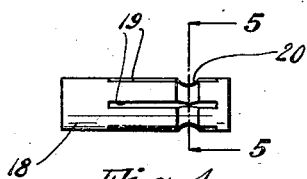
Figure 5:
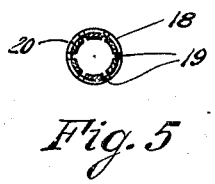
Figure 6:
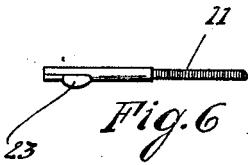
Figure 7:
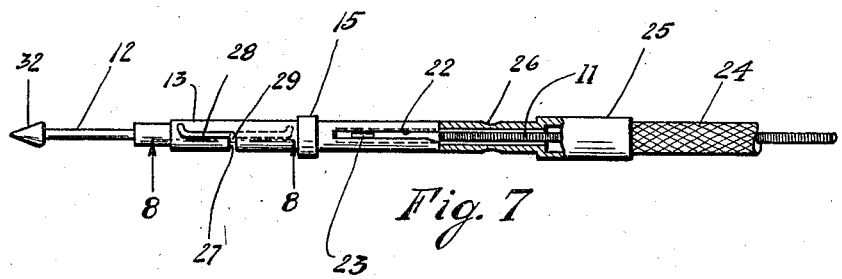
Figure 8:
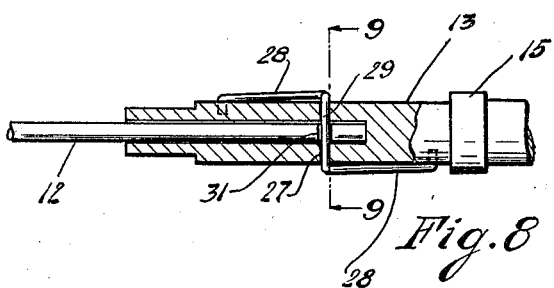
Figure 10:
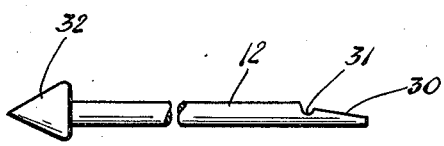
Figure 9:
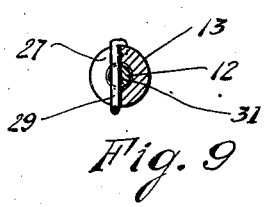

The invention will be best understood by reference to the accompanying drawings forming a part of this specification, and in which, Fig. 1, is a side elevation of the invention, Fig. 2, is a view of the invention partly in section showing means for detachably securing manicuring tools in the device, Fig. 3, is a view of the invention similar to Fig. 2, partly in section, showing the means for detachably connecting the driving shaft to the device, Fig. 4, is a detail view of the bushing used in connection with the means for detachably connecting the shaft to the device, Fig. 5, is a sectional view on the line 5—5 of Fig. 4, Fig. 6, is a detail view of the end of the flexible shaft, Fig. 7, is a view partly in section of the rotatable member of the device, showing the means for connecting the shaft and the manicuring tools, Fig. 8, is a view partly in section on the line 8—8 of Fig. 7, Fig. 9, is a section on the line 9—9 of Fig. 8, and Fig. 10, is an enlarged detail view of one form of a manicuring tool used in connection with the device.

Referring to the drawings, 10 represents a handle in the form of a housing, 11 the shaft connected therewith, and 12 the manicuring instrument adapted to be driven by the shaft 11. The housing 10 is provided with a rotatable member 13, which has its forward end mounted in the bearing 14, there being a collar 15 mounted on the member for centering the same. Adapted to be seated on shoulders 16 provided in the housing 10 is a thimble 17 surrounding the member 13 and having its forward end abutting against the collar 15 as shown in Fig. 3. Seated in the thimble 17 is a bushing 18 which surrounds the member 13. The bushing 18 may be of any suitable material, and is preferably provided with longitudinal slits 19, and the slit portions are provided with an annular constriction 20 as shown in Fig. 4. A cap 21 is disposed about the bushing 18 and is adapted to be threaded into the housing 10, the spun ends 21' of said cap when in position serving to secure the bushing 18, the thimble 17 and consequently the rotatable member 13 by reason of the engagement of the thimble 17 with the collar 15. The rear end of the member 13 is provided with a slot 22 as shown in Fig. 7, and adapted to be slidably disposed in said slot is a key 23 upon the end of the flexible shaft 11. The flexible shaft 11 is preferably provided with an outer casing or sheath 24 in the ordinary manner, and to the sheath 24 adjacent the end of the shaft 11 there is connected a plug 25, such plug being provided with a groove 26 adjacent its end. By this arrangement when the key 23 on the shaft 11 is placed in the slot 22, the plug 25 is telescopically engaged with the bushing 18, the action being such that the constricted portion 20 of the bushing is expanded by the end of the plug 25, continued movement of the plug inwardly, causing the constricted portions to snap into the groove 26 thus detachably securing the plug to the housing and thereby retaining the end of the shaft 11 in proper position, to drive the member 13.

The forward portion of the rotatable member 13 is preferably provided with a cylindrical bore for the reception of a manicuring tool of the type shown in the various figures. In order to detachably retain a manicuring tool in operative position in the member 13, I preferably provide such member with a transverse slot or opening 27, as shown in Figs. 2, 3, 7, 8 and 9, which slot communicates with the bore in the member 13. Preferably secured on the outer surface of the member 13 is a spring having longitudinal portions 28, the ends of which are secured on the opposite sides of the member 13, there being a transverse portion 29 traversing the slot 27. The manicuring tool 12 preferably has its inner end bevelled as shown at 30, and also is preferably provided with a notch 31. The manicuring tool 12 as shown is provided with a head 32 which may be in the form of an emery wheel, a brush, buffer, file or the like, as is necessary in manicuring operations. When it is desired to place the manicuring tool in position in the rotatable member, the bevelled end 30 is pushed inwardly beneath the portion 29 of the spring, causing such portion to snap into the notch 31, thereby holding the manicuring tool against rotation with respect to the member 13, and also against casual detachment, such manicuring tool being extracted by applying some little tension thereon which causes the portion 29 to raise out of the groove 31.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. A device of the character described comprising a housing having a rotatable member therein, there being a slot in such member; a driving shaft having a key detachably engaging in said slot; a casing for said shaft; means for detachably connecting said casing and said housing for holding said key in said slot, comprising an expansible constricted portion and a grooved plug engageable therein; and means for connecting a tool to said rotatable member.

2. A device of the character described comprising a housing having a rotatable member therein; driving means adapted to be held in engagement with said rotatable member; a casing for said driving means; and a detachable connection between said casing and said housing comprising a bushing having a plurality of longitudinal slits between its ends, said slitted portions being constricted; and a plug having a groove therein adapted in operative position to be engaged by the constricted portions; and means for connecting a manicuring tool to said rotatable member.

3. A device of the character described comprising a housing having a rotatable member mounted therein; means on said member for centering the same; a thimble surrounding said rotatable member and engaging said centering means; a bushing with slits providing resilient elements disposed about said rotatable member and mounted in said thimble; a cap disposed about said bushing and threaded in said housing; a flexible shaft adapted to detachably engage said member; and a casing for said shaft having a plug adapted to detachably engage said resilient elements.

4. A device of the character described comprising a housing having a rotatable member mounted therein; means on said member for centering the same; a thimble surrounding said rotatable member and engaging said centering means; a bushing disposed about said rotatable member and mounted in said thimble, said bushing having a plurality of slits, the portions formed by the slits being annularly constricted; a cap disposed about said bushing and secured to said housing; a flexible shaft adapted to detachably engage said rotatable member; and a casing for said shaft having a plug adapted to detachably engage said bushing, there being a groove in said plug adapted to receive the constricted portions of said bushing.

5. A device of the character described comprising a housing having a rotatable member therein, there being a bore in said member, and a transverse opening communicating with said bore; a spring having a transverse portion disposed in said opening across said bore, and having its ends extending axially of said member and releasably engaged in opposite sides thereof; and a manicuring tool having a cross notch in which said spring engages, and being bevelled downward from said notch.

6. A device of the character described comprising a housing having a rotatable member therein, there being a slot in one portion of said member, and a bore in another portion thereof with an opening communicating with said bore; a driving shaft having a key detachably engaging in said slot; a casing for said shaft; means for detachably connecting said casing and said housing for holding said key in said slot, including a slitted resilient portion and a plug clamped thereby; yieldable means disposed in said opening; and a manicuring tool adapted to be inserted in said bore and adapted to be engaged by said yieldable means.

7. A device of the character described comprising a housing having a rotatable member therein; driving means adapted to be held in engagement with said rotatable member; a casing for said driving means; a detachable connection between said casing and said housing comprising a bushing having a plurality of longitudinal slits between its ends, said slitted portions being constricted, and a plug having a groove therein, adapted in operative position to be engaged by the constricted portions; means for connecting a manicuring tool to said rotatable member; there being a bore in the opposite ends of said rotatable member, and an opening communicating with said bore; yieldable means disposed in said opening; and a manicuring tool adapted to be inserted in said bore and adapted to be engaged by said yieldable means.

8. A device of the character described comprising a housing having a rotatable member therein; driving means adapted to be held in engagement with said rotatable member; a casing for said driving means; a detachable connection between said casing and said housing comprising a bushing having a plurality of longitudinal slits between its ends, said slitted portions being constricted, and a plug having a groove therein adapted in operative position to be engaged by said constricted portions; means for connecting a manicuring tool to said rotatable member, there being a bore in said rotatable member, and an opening communicating with said bore; a spring having its ends secured at opposite sides of said member and having a transverse portion mounted in said opening; and a manicuring tool having its inner end bevelled and adapted to be inserted beneath said spring, and having a notch at the end of said bevel adapted to receive said spring.

In testimony whereof I have signed my name to this specification in the presence of two subscribing witnesses.

GEORGE W. MOORE.

Witnesses:
 JOSHUA R. H. POTTS,
 FREDA C. APPLETON.